(12) United States Patent
Dutta Gupta et al.

(10) Patent No.: US 7,894,137 B2
(45) Date of Patent: Feb. 22, 2011

(54) OMNIDIRECTIONAL ANTIREFLECTION COATING

(75) Inventors: Subhasish Dutta Gupta, Hyderabad (IN); Girish S. Agarwal, Stillwater, OK (US)

(73) Assignees: The Board of Regents for Oklahoma State University, Stillwater, OK (US); The University of Hyderabad, Hyderabad (IN)

( * ) Notice: Subject to any disclaimer, the term of this patent is extended or adjusted under 35 U.S.C. 154(b) by 926 days.

(21) Appl. No.: 11/739,442

(22) Filed: Apr. 24, 2007

(65) Prior Publication Data

US 2009/0323190 A1    Dec. 31, 2009

(51) Int. Cl.
    *G02B 1/10* (2006.01)
(52) U.S. Cl. .................................. 359/586; 359/587
(58) Field of Classification Search .................. 359/586, 359/581, 587
    See application file for complete search history.

(56) References Cited

U.S. PATENT DOCUMENTS

| | | | |
|---|---|---|---|
| 4,583,822 | A | 4/1986 | Southwell |
| 5,811,191 | A | 9/1998 | Neuman |
| 6,248,448 | B1 | 6/2001 | Lippey et al. |
| 6,825,976 | B2 | 11/2004 | Paul et al. |
| 6,942,924 | B2 | 9/2005 | He et al. |

OTHER PUBLICATIONS

Kasikov et al, "Refractive Index Gradients in $TiO_2$ Thin Films Grown by Atomic Layer Deposition," *Journal of Physics D: Applied Physics*, 2006, pp. 52-60, vol. 39, Publisher: Institute of Physics Publishing.
Kay et al, "Reflectionless Transmission Through Dielectrics and Scattering Potentials," *Journal of Applied Physics*, 1956, pp. 1503-1508, vol. 27, No. 12.
Kintaka et al, "Antireflection Microstructures Fabricated Upon Fluorine-Doped $SiO_2$ Films," *Optics Letters*, Nov. 1, 2001, pp. 1642-1644, vol. 26, No. 21, Publisher: Optical Society of America.
Kiriushcheva et al, "Scattering of a Gaussian Wave Packet by a Reflectionless Potential," *Am. J. Phys.*, 1998, pp. 867-872, vol. 66, No. 10, Publisher: American Association of Physics Teachers.
Lalanne et al, "Antireflection Behavior of Silicon Subwavelength Periodic Structures for Visible Light," *Nanotechnology*, 1997, pp. 53-56, vol. 8, Publisher: IOP Publishing Ltd.
Leonhardt et al, "Optical Conformal Mapping," *Science*, 2006, pp. 1777-1780, vol. 213, Publisher: American Association for the Advancement of Science.
Pendry et al, "Controlling Electromagnetic Fields," *Science*, 2006, pp. 1780-1782, vol. 312, Publisher: American Association for the Advancement of Science.

(Continued)

*Primary Examiner*—Joshua L Pritchett
(74) *Attorney, Agent, or Firm*—Fellers Snider Blankenship Bailey Tippens, PC (57) ABSTRACT

An antireflective coating is disclosed having at least one layer of a first material with a first index of refraction and a first thickness, the first index of refraction and first thickness substantially conforming to a refractive index profile matching a reflectionless potential.

11 Claims, 9 Drawing Sheets

OTHER PUBLICATIONS

Poitras et al, "Toward Perfect Antireflection Coatings. 2. Theory," *Applied Optics*, Feb. 20, 2004, pp. 1286-1295, vol. 43, No. 6, Publisher: Optical Society of America.

Sankur et al, "Broadband Gradient-Index Antireflection Coating for ZnSE," *Applied Optics*, Aug. 15, 1984, pp. 2770-2773, vol. 23, No. 16, Publisher: Optical Society of America.

Schonfeld et al, "On the Convergence of Reflectionless Approximations to Confining Potentials," *Annals of Physics*, 1980, pp. 1-28, vol. 128, Publisher: Academic Press, Inc.

Tang et al, "Experimental Study on Intermediate and Gradient Index Dielectric Thin Films by a Novel Reactive Sputtering Method," *J. Vac. Sci. Technolo. A*, 1997, pp. 2670-2672, vol. 15, No. 5, Publisher: American Vacuum Soceity.

Thacker et al, "Inverse Scattering Problem for Quarkonium Systems. I. One-Dimensional Formalism and Methodology," *Physical Review D*, 1978, pp. 274-286, vol. 18, No. 1.

Zaitsu, "Optical Thin Films Consisting of Nanoscale Laminated Layers," *Applied Physics Letters*, Apr. 8, 2002, pp. 2442-2444, vol. 80, No. 14, Publisher: American Institute of Physics.

Drazin et al, *Solutions—An Introduction*, Chapter 3, 1989, Publisher: Cambridge University Press.

OMNIDIRECTIONAL ANTIREFLECTION COATING

FIELD OF THE INVENTION

This disclosure relates to thin film coatings in general, and more particularly, but not by way of limitation, to antireflective coatings.

BACKGROUND OF THE INVENTION

It is now well understood that any inhomogeneity in an otherwise homogeneous medium can cause at least a partial reflection of any energy passing therethrough. For example, when light encounters an interface between two different dielectrics, a partial (or, in some cases, total) reflection occurs, the magnitude of which depends on the physical parameters of the dielectrics. A common measure of the expected reflection intensity at an interface is the reflection coefficient, which is the ratio of the intensity of the reflected light to that of the incident light. For nonmagnetic media, reflectivity depends on the polarization of the incident light, the angle of incidence, the dielectric constants of the media, and also the wavelength of the incident light, since the optical properties may depend on the wavelength (referred to as dispersion).

Although occasionally it is desirable to enhance the reflectivity at an interface, it is more common to seek to reduce it. The air-glass interface provides one common example of a scenario where a reduction in reflectivity is often sought. As an example, it is often a must for optical instrumentation to suppress reflection at the many interfaces of the optical components in order to increase the light throughput.

The $\lambda/4$ technique for reducing reflectivity at an interface is a well-known one. In brief, in order to reduce reflectivity at an interface for light at wavelength $\lambda$, a thin film of thickness $\lambda/4$ is introduced between the two media. The refractive index of the thin film is typically chosen to be intermediate between that of the medium of incidence and that of the substrate. The physical principle that enables the operation of a $\lambda/4$ plate is the fact that waves reflected back in the medium of incidence from the two interfaces cancel each other in a destructive interference. Clearly, for a given polarization and angle of incidence, this approach will only be optimal for a single wavelength. Thus, perturbing any of the foregoing parameters will tend to reduce the amount of destructive interference, thereby resulting in greater reflection at the interface.

Generally speaking, antireflection coatings today suffer from limited bandwidths as well as very restricted range of angles of incidence for satisfactory operation. The limited wavelength range and angle range of existing films render them unsuitable for disparate applications eliminating the off-the-shelf, immediate delivery of such components.

Therefore what is needed is a system and method for addressing the above and related issues.

Before proceeding to the description of the present invention, however, it should be noted and remembered that the description of the invention which follows, together with the accompanying drawings, should not be considered as limiting the invention to the examples (or preferred embodiments) shown and described. This is so because those skilled in the art to which the invention pertains will be able to devise other forms of the invention within the ambit of the appended claims.

SUMMARY OF THE INVENTION

The present invention disclosed and claimed herein, in one embodiment thereof, comprises an antireflective coating comprising at least one layer of a first material with a first refractive index profile and a first thickness, the first refractive index profile and first thickness being chosen to be substantially conforming to a refractive index profile developed according to the methods taught herein.

In one embodiment of the present invention the antireflective coating has a refractive index profile derived by selecting the free parameters $A_1 \ldots A_N$ and $\kappa_1 \ldots \kappa_N$ for the set of simultaneous linear equations given by:

$$\sum_{j=1}^{N} M_{ij} f_j(z) = -A_i e^{\kappa_i z}, \; M_{ij} = \delta_{ij} + \frac{A_i e^{(\kappa_i + \kappa_j)z}}{(\kappa_i + \kappa_j)}, \; i = 1 \ldots N$$

calculating the determinant, D, of a matrix of the set of coefficient of the set of simultaneous linear equations, determining a refractive index profile by the equation:

$$n^2(z) = n_s^2 + \frac{2}{k_0^2} \frac{d^2}{dz^2}[\log(D)]$$

In another embodiment, in order to account for the substrate, the refractive index profile is given by the equation:

$$n^2(z) = n_{s1}^2 + \frac{2}{k_0^2} \frac{d^2}{dz^2}[\log(D)] + \frac{n_{s2}^2 - n_{s1}^2}{2}[1 + \tanh(\kappa_1 z)].$$

BRIEF DESCRIPTION OF THE DRAWINGS

Other objects and advantages of the invention will become apparent upon reading the following Detailed Description and upon reference to the drawings in which.

DETAILED DESCRIPTION OF THE PREFERRED EMBODIMENTS

In one embodiment, a method of designing one dimensional refractive index profiles which does not depend on quarter wavelength plates is disclosed. Broadly speaking, the method is founded on a consideration of reflectionless potentials in quantum mechanics and optics (see e.g. I. Kay and H. E. Moses, "Reflectionless transmission through dielectrics and scattering potentials", *J. Appl. Phys.* 27, 1503 (1957), herein incorporated by reference). As shown and explained in the examples herein, realistic index profiles based on the reflectionless potentials can lead to almost-omnidirectional antireflection coatings which are effective over broad wavelength bands for both TE (transverse electric) or the TM (transverse magnetic) polarizations of light.

Reflectionless potentials theoretically extend from −∞ to ∞ in thickness, however any coating that is actually produced will likely be in the range of several microns thick. Moreover, the coating may be applied to a substrate (e.g., a glass lens, a prism, a viewfinder, etc.) whose presence is to be accounted for.

As described and disclosed herein, by deposition of suitable refractive index profiles on the two sides of any lossless thin film, the same can be, in effect, rendered substantially invisible. Such invisibility would hold for a large range of angles and also over a broad frequency range.

Disclosed herein is a procedure for constructing refractive index profiles, with or without a substrate, which may lead to substantially total transmission of incident light. Since any realistic system is bound to be finite, the refractive index profile is and the reflection coefficient for both TE and TM polarizations is calculated.

By way of an explanation of the underlying theory, consider a nonmagnetic (μ=1) stratified medium with the dielectric function varying as $\in = \in(z)$. Initially, the case is considered where $\in(z)=\in_s$ as $z \to \pm\infty$, though this can be relaxed later to incorporate the effect of a substrate. Any incident plane wave with arbitrary polarization can be considered to be a mixture of two independent polarizations, namely, the TE (transverse electric) or the TM (transverse magnetic). The TE (TM) wave has only one non-vanishing electric (magnetic) field component perpendicular to the plane of incidence (e.g., the xz plane). Assuming a temporal dependence, the propagation equations for the electric field of the TE waves and the magnetic field of TM waves can be written as $$\frac{d^2\varepsilon}{dz^2} + (k_0^2\varepsilon(z) - k_x^2)\varepsilon = 0, \tag{1}$$

$$\frac{d^2\mathcal{H}}{dz^2} - \frac{d\mathcal{H}}{dz}\frac{d(\ln\varepsilon(z))}{dz} + (k_0^2\varepsilon(z) - k_x^2)\mathcal{H} = 0, \tag{2}$$

where $k_x = k_0\sqrt{\in_s}\sin\theta$ is the x-component of the wave vector for wave incident at −∞ at an angle θ, $k_0 = \omega/c$ is the free space wave vector, E is the electric field of transverse electric waves, and $\mathcal{H}$ is the magnetic field of transverse magnetic waves. For a given $\in(z)$ profile introducing E and V(z) as $$V(z)=k_0^2\in_s - k_0^2\in(z), \tag{3}$$

$$E = k_0^2 \in_s \cos^2\theta, \tag{4}$$

Eq. (1) can be recast in the form of stationary Schrödinger equation with energy E and potential V(z).

$$\frac{d^2\Psi}{dz^2} + (E - V(z))\Psi = 0 \tag{5}$$

The potential V(z) in Eq. (5) is said to be reflectionless if any wave with arbitrary positive energy can pass through the potential completely. It is also clear that Eq. (3) establishes the relation between the reflectionless potential and the corresponding dielectric function profile $\in(z)$. Since the refractive index is given by the square root of the dielectric function, Eq. (3) can be rewritten to yield the corresponding reflectionless refractive index profile n(z) as $$n^2(z) = n_s^2 - \frac{V(z)}{k_0^2}, \quad \varepsilon_s = n_s^2 \tag{6}$$

Due to the presence of the log derivative of the profile $\in(z)$ in (2), a similar rewriting leading to an equation like (6) is not achievable for the TM-waves. Eq. (4) clearly indicates that a change in the angle corresponds to a change in the energy (albeit in a finite domain) in the corresponding quantum problem. It is thus possible to consider reflectionless dielectric function profiles for all possible angles of incidence for a given wavelength. As will be shown later, such omnidirectional substantially total transmission exists even for realistic (i.e. truncated) finite domain $\in(z)$ profiles. However, designing a profile that is totally reflectionless for both TE and TM waves is not possible (compare Eqs. (1) and (2)). Fortunately, as we will see reflectionless profiles for TE waves turns out to be substantially reflectionless even for TM-waves for large angular domains.

The situation is a bit more involved in case of wavelength dependence. As is clear from Eq. (6) that the index profile n(z) depends on the wavelength. Potentials designed to be reflectionless at one wavelength are not necessarily reflectionless at other wavelengths. Fortunately again, the deviation from total transmission at lower wavelengths is not significant. Therefore, in application, dielectric function profiles based on reflectionless potentials can offer flat response almost with total transmission over large angle and wavelength regions.

Described below is one method to construct the reflectionless potentials and the corresponding refractive index profiles (see Eq. (6)). Several known theorems developed by I. Kay and H. E. Moses, mentioned previously, can be useful here.

Assume that 2N positive arbitrary constants $A_1, A_2, \ldots A_N$ and $\kappa_1, \kappa_2, \ldots \kappa_N$, are given. The following steps are then undertaken:

1. Consider the following set of simultaneous linear equations:

$$\sum_{j=1}^{N} M_{ij} f_j(z) = -A_i e^{\kappa_i z}, M_{ij} = \delta_{ij} + \frac{A_i e^{(\kappa_i + \kappa_j)z}}{(\kappa_i + \kappa_j)}, i = 1 \ldots N. \quad (7)$$

Note that, in Eq. (7) $-k_n^2$ and $f_n(z)$ correspond to eigenvalue and eigenfunction of the corresponding Sturm-Liouville problem with V(z) in Eq. (5) representing the reflectionless potential.

2. Construct the determinant $D=|M_{ij}|$ of the coefficient matrix in Eq. (7).

3. Then the reflectionless potential V(z) is given by $$V(z) = -2 \frac{d^2}{dz^2} [\log(D)], \quad (8)$$

4. As per Eq. (6) the corresponding index profile n(z) is given by $$n^2(z) = n_s^2 + \frac{2}{k_0^2} \frac{d^2}{dz^2} [\log(D)] \quad (9)$$

Note that D is determined from $|M_{ij}|$ which in turn is determined by the choice of the free parameter $A_i$'s, $\kappa_i$'s Some principal aspects of the instant invention will be illustrated further in the following examples.

Example 1

Consider a case where there is only one non-vanishing $A_1$ and $\kappa_1$ pair, with $A_1 = 2\kappa_1$. It then follows that:

$$D(z) = 1 + e^{2\kappa_1 z} : n^2(z) = n_s^2 + \frac{2\kappa_1^2}{k_0^2} Sech^2(\kappa_1 z). \quad (10)$$

The potential V(z) in the quantum context is known by the name modified Poschl-Teller potential.

Choosing $A_1 = 2\kappa_1$, results in a maximum of Eq. (10) (i.e. the refractive index) at z=0. Similarly, for the 2-parameter family $A_1, A_2 \neq 0$, $$D(z) = 1 + \frac{A_1}{2\kappa_1} e^{2\kappa_1 z} + \frac{A_2}{2\kappa_2} e^{2\kappa_2 z} + \frac{(\kappa_1 - \kappa_2)^2 A_1 A_2 e^{2(\kappa_1 + \kappa_2)z}}{4\kappa_1 \kappa_2 (\kappa_1 + \kappa_2)^2} \quad (11)$$

Thus, increasingly complex refractive index profiles result with an increase in the permissible number of parameters. In the experience of the instant inventors, a four-parameter family will typically achieve satisfactory results over large wavelength ranges and a large range of angles of incidence, although it is possible to use more or fewer parameters. In fact, equal or even better performance with lower parameter families is not ruled out.

Equations (8) and (9) and the methods described herein place no per se limitations on the choice of the A's and $\kappa$'s except that they should be real valued and non-negative. However, since the refractive index values are limited in a practical sense to values for known and usable materials, discretion should be exercised in choosing the constants, so as not to end up with design parameters that call for a thin film that is impossible to produce. Further, any engineered inhomogeneous system needs to be finite, in contrast to the theoretically optimal profile (6) (or (9)), which is defined on infinite support. Therefore, it may be useful to look at the deviations from truly reflectionless behavior that may result when the substrates are finite in thickness and/or extent.

Figure 9:
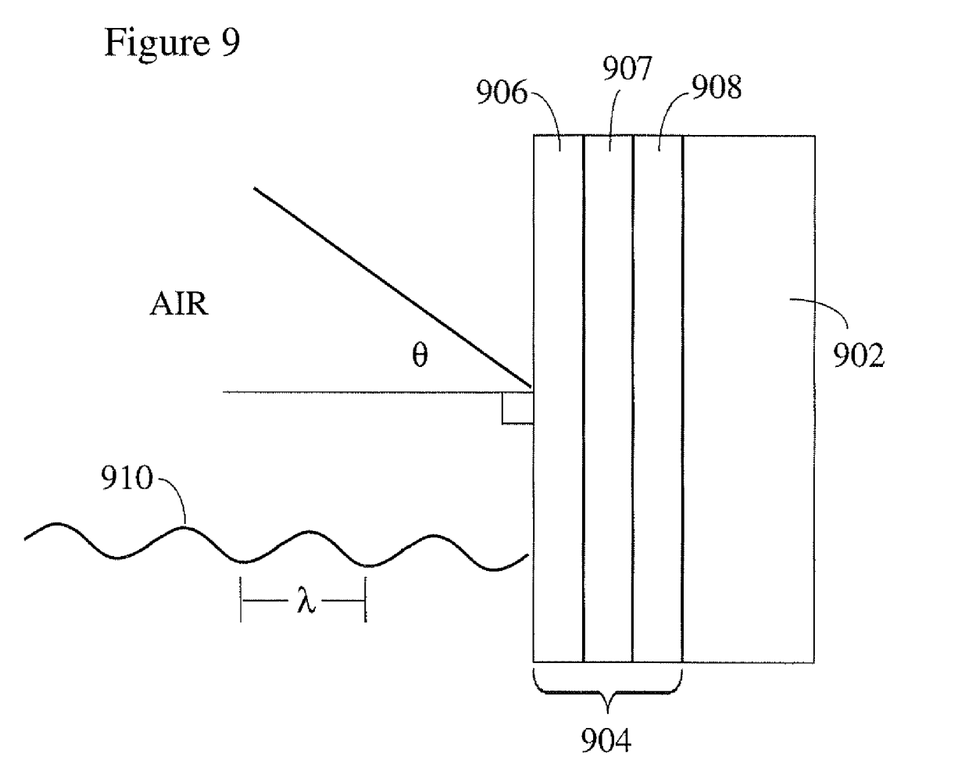
FIG. 9 is a cross sectional view of a thin film antireflective coating constructed according to aspects of the present disclosure.

Finally, the thin AR (antireflective) coatings will preferably be deposited on a substrate. Referring now to FIG. 9, this figure contains a cross sectional view of a thin film antireflective coating constructed according to aspects of the present disclosure. FIG. 9 is not to scale but has had portions enlarged to better illustrate the present techniques and methods. A substrate 902 is shown, which may be, for example, a lens, a portion of a lens, or any other substrate for which antireflective properties are desired. A thin film antireflective coating 904 is shown applied to the substrate 902. As can be seen, in some preferred embodiments the thin film coating 904 will comprise multiple layers 906, 907, 908 of antireflective materials which have been chosen in such as way as to discretely approximate a continuously varying reflection index profile (n(z)) of the sort discussed above. The materials 906, 907, 908 will preferably be chosen based on their known indices of refraction and may be applied to the substrate 904 in predetermined thickness in order to replicate the designed and desired refractive index profile derived as described herein. Although, FIG. 9 illustrates an example that was constructed using three layers 906, 907, 908, it is understood that more or fewer could be used depending upon the desired profile, the materials available, and other needs of the user. In FIG. 9, the variable θ represents the angle of incidence (as measured from the normal to the surface) of a wave of light having wavelength λ. Thus, from this figure the concepts of wavelength, incidence angle, and a multi-layered AR coating built to a specified profile can be more readily appreciated.

In order to account for the substrate effects, one may consider the profile built on a smooth hyperbolic-tangent ramp $$n^2(z) = n_{s1}^2 + \frac{2}{k_0^2} \frac{d^2}{dz^2} [\log(D)] + \frac{n_{s2}^2 - n_{s1}^2}{2} [1 + \tanh(\kappa_1 z)] \quad (12)$$

where $n_{s1}$ and $n_{s2}$ are the refractive indices of the bounding media on the left and right of the inhomogeneous medium, respectively.

When a four-parameter profile is used, it may not be possible to symbolically manipulate and solve the equations as was done with Eq. (11). Of course, methods for numerically solving such a system of equations are well known to those of ordinary skill in the art and/or values might be obtained by numerical simulation or some other method.

Example 2

As was mentioned previously, the A's and $\kappa$'s should be chosen to be non-negative and real to increase the possibility that the resulting n(z) is physically realizable. Once a design wavelength has been chosen, the practical guideline is offered by the profile (10). For example, for a given λ, using the extremal value of V(z), e.g., $-2\kappa_1^2$ in Eq. (6), one can estimate the value of $\kappa_1$ using the following equation $$\kappa_1 = (\pi/\lambda)\sqrt{2(n_{max}^2 - n_s^2)} \qquad (13)$$

where $n_{max}$, is the peak value of the refractive index profile corresponding to (10). For example, for $\lambda=1.06$ μm, $n_s=1.0$, $n_{max}=1.65$, Eq. (13) yields an approximate value of $\kappa_1$ of 5.5 μm$^{-1}$. Henceforth, it will be assumed that length is measured in microns and the units in the constants will be suppressed. Thus for the simplest reflectionless index profile one has $\kappa_1=5.5$ and $A_1=2\kappa_1=11.0$.

Regarding the effect of the additional three pairs of constants of the four parameter family on this profile as compared with the single parameter family, if the eigenvalues $\kappa_j$'s are disparate, then the localized profile will typically remain similar in character and relatively smooth, possibly with some distortions. On the other hand, closely spaced eigenvalues may lead to profiles with distinct peaks. In the experience of the instant inventors, the values of $A_j$'s do not typically substantially affect qualitatively the shape of the profile. In view of the aforesaid, in this example the following values were assigned to each constant: $A_1=11$, $A_2=A_3=3.0$, $\kappa_1=5.5$, $\kappa_2=0.1$, $\kappa_3=1.0$, $\kappa_4=9.0$.

Figure 1:
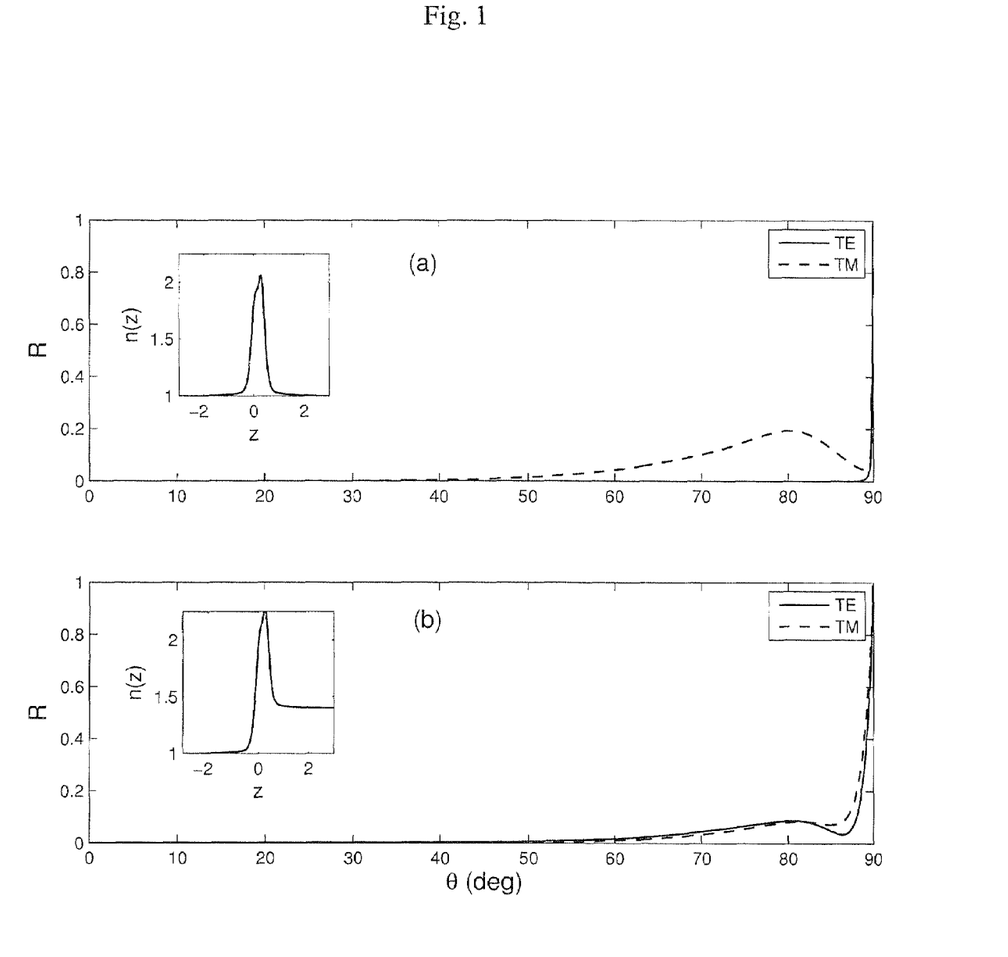
FIG. 1 is a graph illustrating the intensity reflection coefficient R as a function of angle of incidence $\theta$ for an inhomogeneous film according the present disclosure (a) without or (b) with a substrate at $\lambda=1.06$ μm, with the insets showing the refractive index profiles.

In one embodiment, a transfer matrix technique of numerical simulation that utilized a fine subdivision of the varying profile was used. Both the angle and the wavelength dependence of the reflection coefficient are calculated. Referring now to FIG. 1 a graph of the intensity of the reflection coefficient R as a function of angle of incidence θ for a thin film constructed according the values above (a) without or (b) with the substrate at $\lambda=1.06$ μm is shown. The solid curves represent the theoretical value for the TE polarization and the dashed curves are for the TM polarization. The insets show the refractive index profiles. In the current example, the inhomogeneous film is assumed to occupy a region $-3$ μm$\leq z \leq 3$ μm beyond which the left medium is assumed to be air ($n_s = n_{s1}=1.0$), while the substrate is assumed to have a refractive index 1.4 ($n_{s2}=1.4$).

Figure 2:
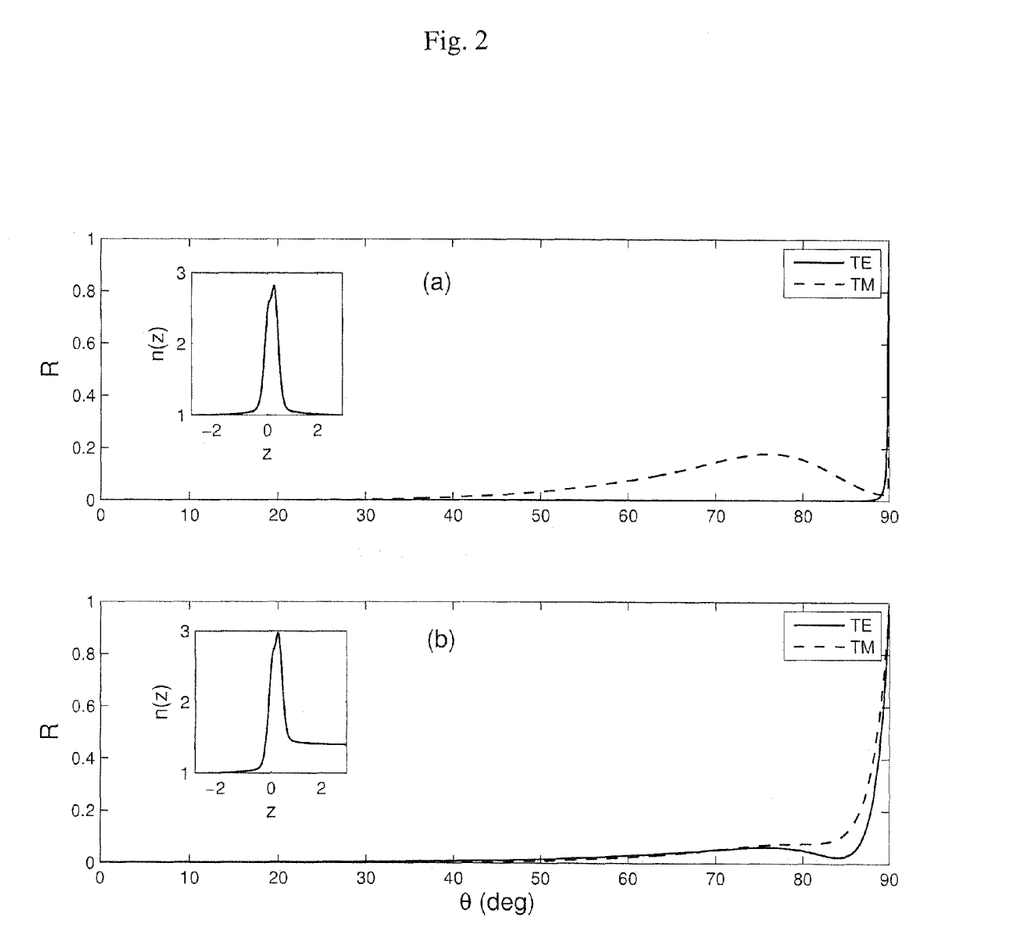
FIG. 2 is a graph illustrating the intensity reflection coefficient R as a function of angle of incidence $\theta$ for another inhomogeneous film according the present disclosure (a) without or (b) with a substrate at $\lambda=1.55$ μm, with the insets showing the refractive index profiles.

Referring now to FIG. 2, the value of the reflection coefficient R as a function of angle of incidence θ for the inhomogeneous film constructed according (a) without or (b) with the substrate at $\lambda=1.55$ μm is shown. The insets show the calculated refractive index profiles for the given parameters. Here the same set of constants was used as with FIG. 1, but at a different wavelength ($\lambda=1.55$ μm) leading to an analogous profile with a larger peak value of refractive index (see inset of FIG. 2). Again, the solid curves are for the TE and the dashed curves are for the TM polarization.

One can easily note the flat response over a very large angular range for both the polarizations. The substrate, while retaining this feature, evens out the differences in response for the two polarizations and demonstrates the methods described herein work well for different wavelengths.

Figure 3:
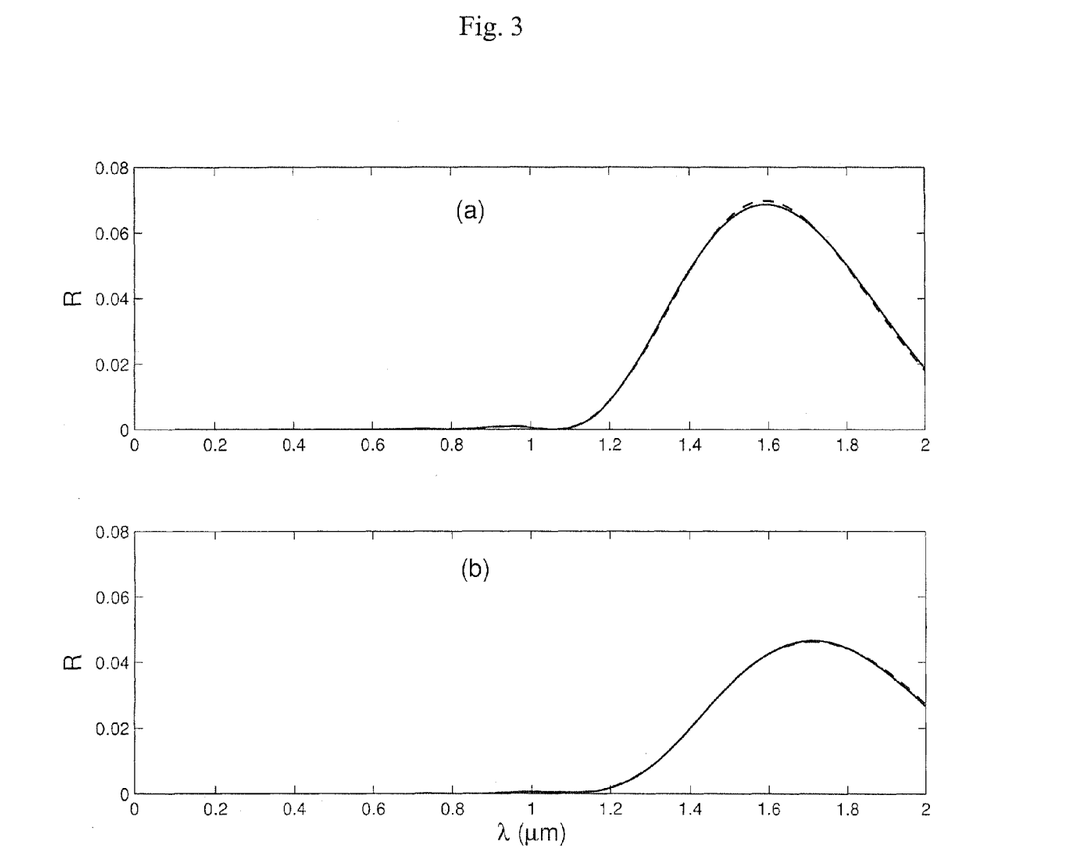
FIG. 3 is a graph illustrating a normal incidence intensity reflection coefficient R as a function of wavelength $\lambda$ for an inhomogeneous film according the present disclosure (a) without or (b) with the substrate.
Figure 4:
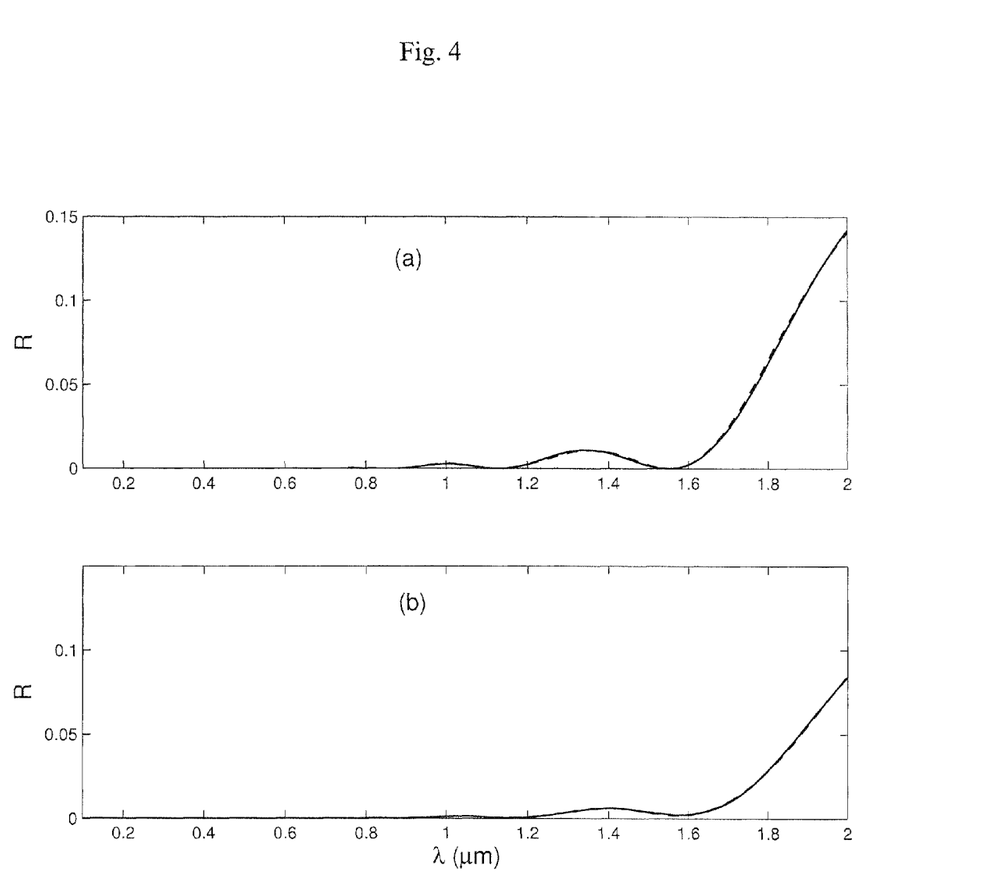
FIG. 4 is a graph illustrating a normal incidence intensity reflection coefficient R as a function of wavelength $\lambda$ for another inhomogeneous film according the present disclosure (a) without or (b) with the substrate.

The wavelength dependence of the reflectivity from such films such as those designed above are now considered in the case of normal incidence. Referring now to FIG. 3, normal incidence intensity reflection coefficient R as a function of wavelength λ for the inhomogeneous film (a) without or (b) with the substrate. This inhomogeneous film is designed at wavelength 1.06 μm. The solid (dashed) lines are for the inhomogeneous film occupying $-3$ μm$\leq z \leq 3$ μm and the dashed lines for the inhomogeneous film occupying $-2$ μm$\leq z \leq 2$ μm. Referring now to FIG. 4, normal incidence intensity reflection coefficient R as a function of wavelength λ for the inhomogeneous film (a) without or (b) with the substrate. This inhomogeneous film is designed at wavelength 1.55 μm. The solid lines are for the inhomogeneous film occupying $-3$ μm$\leq z \leq 3$ μm and the dashed lines for the inhomogeneous film occupying $-2$ μm$\leq z \leq 2$ μm.

It can thus be seen that these films exhibit extremely low reflectivity over a very large range of wavelengths, though they are designed at particular wavelengths. Such flat response over such large spectral ranges is not typically achievable with conventional AR coatings based on quarter wave plates. It is also clear from the comparison that truncation has insignificant effect if the essential features of the inhomogeneity are retained. As has been shown, a higher order family of potentials may provide greater flexibility over the profile leading to lower reflection.

Figure 5:
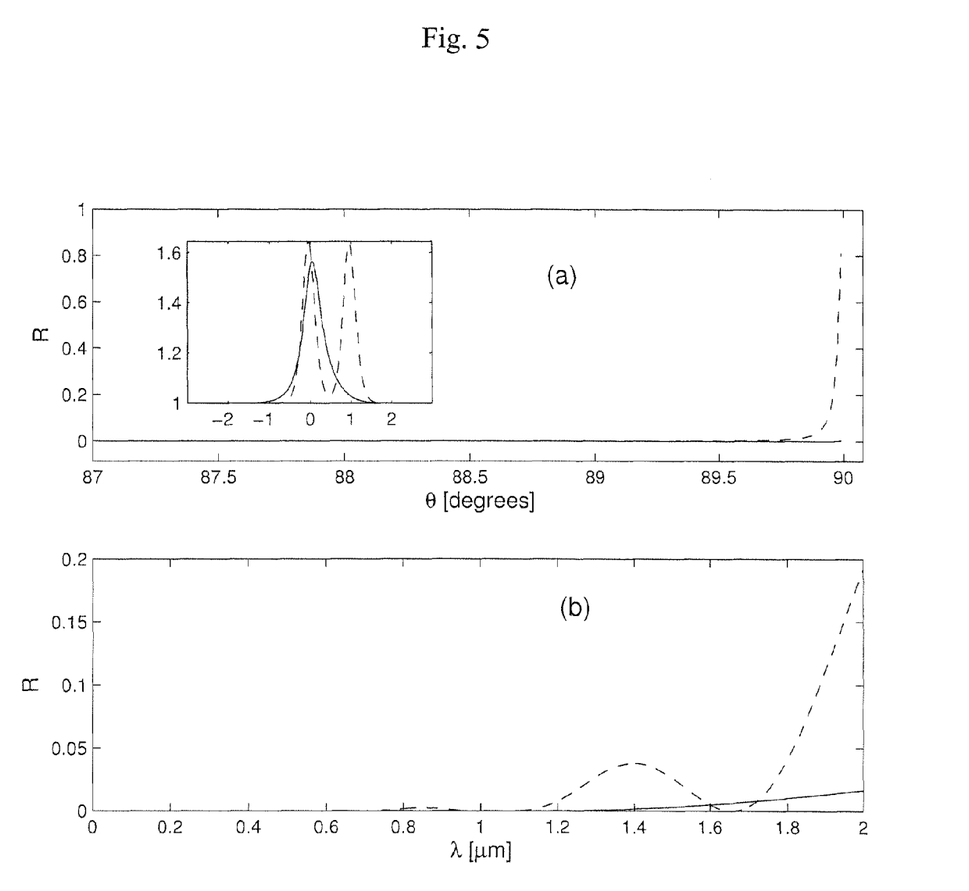
FIG. 5 is a graph illustrating the reflection coefficient R as functions of (a) angle of incidence $\theta$ for TM polarized light and (b) wavelength λ for normal incidence, with corresponding profiles designed at λ=1.06 μm shown in the inset.

Referring now to FIG. 5, the reflection coefficient R as functions of (a) angle of incidence θ for TE polarized light and (b) wavelength λ for normal incidence is shown. The solid lines are for $A_1=11$, $A_2=5.5$ and $\kappa_1=5.5$, $\kappa_2=2.25$ (i.e., for disparate eigenvalues). The dashed lines are for $A_1=11$, $A_2=5.5$ and $\kappa_1=5.5$, $\kappa_2=5.4$ (i.e., for closely spaced eigenvalues). The corresponding profiles designed at $\lambda=1.06$ μm are shown in the inset. These graphs suggest how the proximity of the eigenvalues to each other can potentially yield single and multiple peaked profiles. That is, it can be seen from these examples that systems that have eigenvalues that situated are close to each other produce profiles that have distinct peaks. In view of the foregoing, it should be clear that, generally speaking, systems where the eignvalues are spaced apart from each other tend to yield better antireflection behavior.

Example 3

Figure 6:
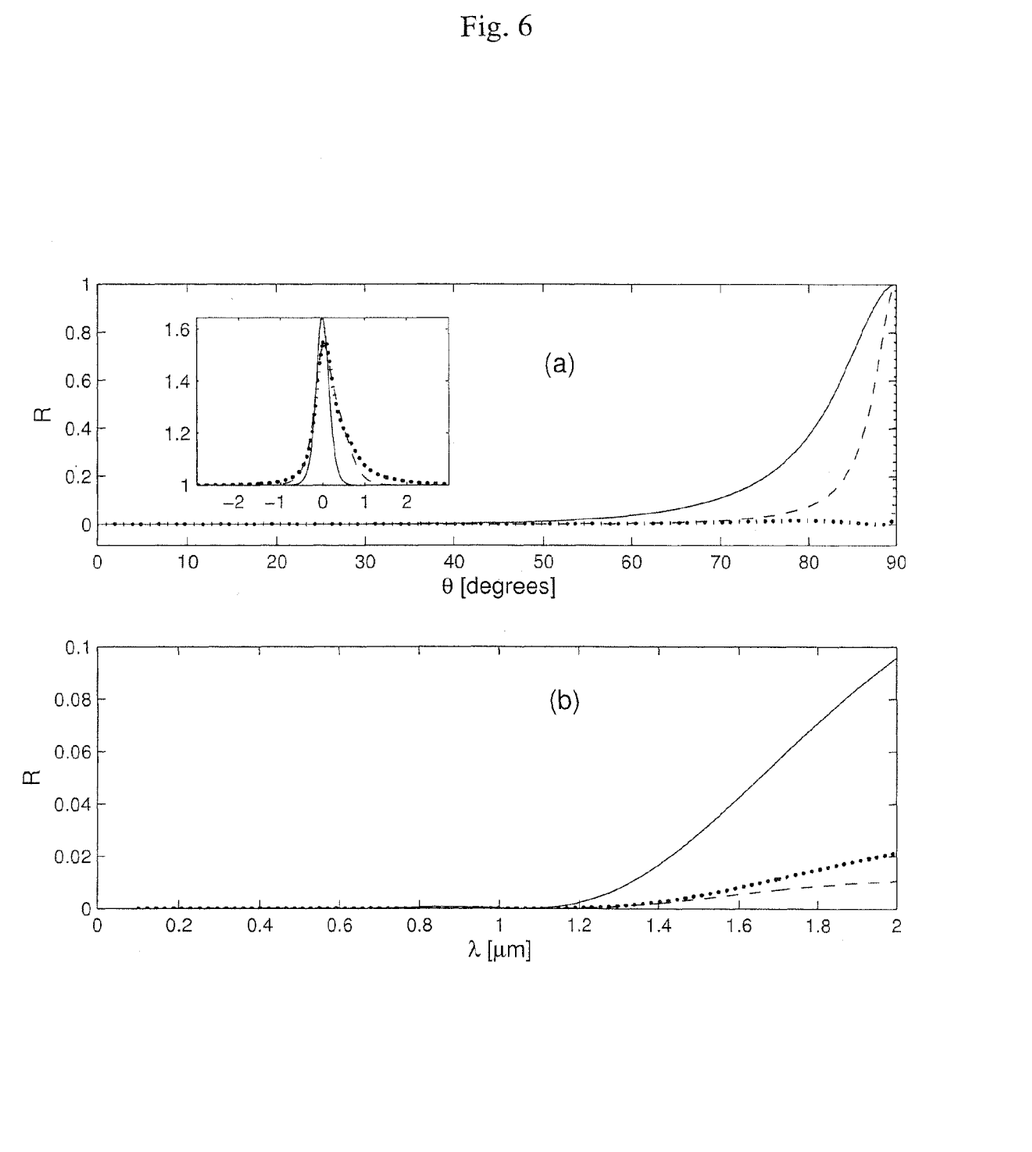
FIG. 6 is a graph illustrating the reflection coefficient R as functions of (a) angle of incidence θ for TM polarized light and (b) wavelength λ for normal incidence.

This example illustrates the increased flexibility that can be obtained through the use of higher order family profiles. Referring now to FIG. 6, this figure contains a plot of the reflection coefficient R as a function of (a) angle of incidence θ for TM polarized light and (b) wavelength λ at normal incidence. The solid, dashed and dotted lines represent three different parameter sets (i) $A_1=11$, $\kappa_1=5.5$, (ii) $A_1=11$, $\kappa_1=5.5$, $A_2=5.5$, $\kappa_2=2.75$, and (iii) $A_1=11$, $\kappa_1=5.5$, $A_2=5.5$, $\kappa_2=2.75$, $A_3=2$, $\kappa_3=1$, respectively. The corresponding reflection coefficient profiles designed at $\lambda=1.06$ μm are shown in the inset. In order to illustrate the additional flexibility that is available with higher order analyses compare the one, two and three parameter families in this figure. It should be clear from FIG. 6 that the two parameter example yields a much better result than the Poschl-Teller profile in both angle and frequency scans. The three parameter profile offers better performance in the angle scan, while its frequency response slightly lags behind that of the two parameter family. However, up to the design wavelength (in this example 1.06 μm), the performances of all the three profiles are substantially similar.

Example 4

Figure 7:
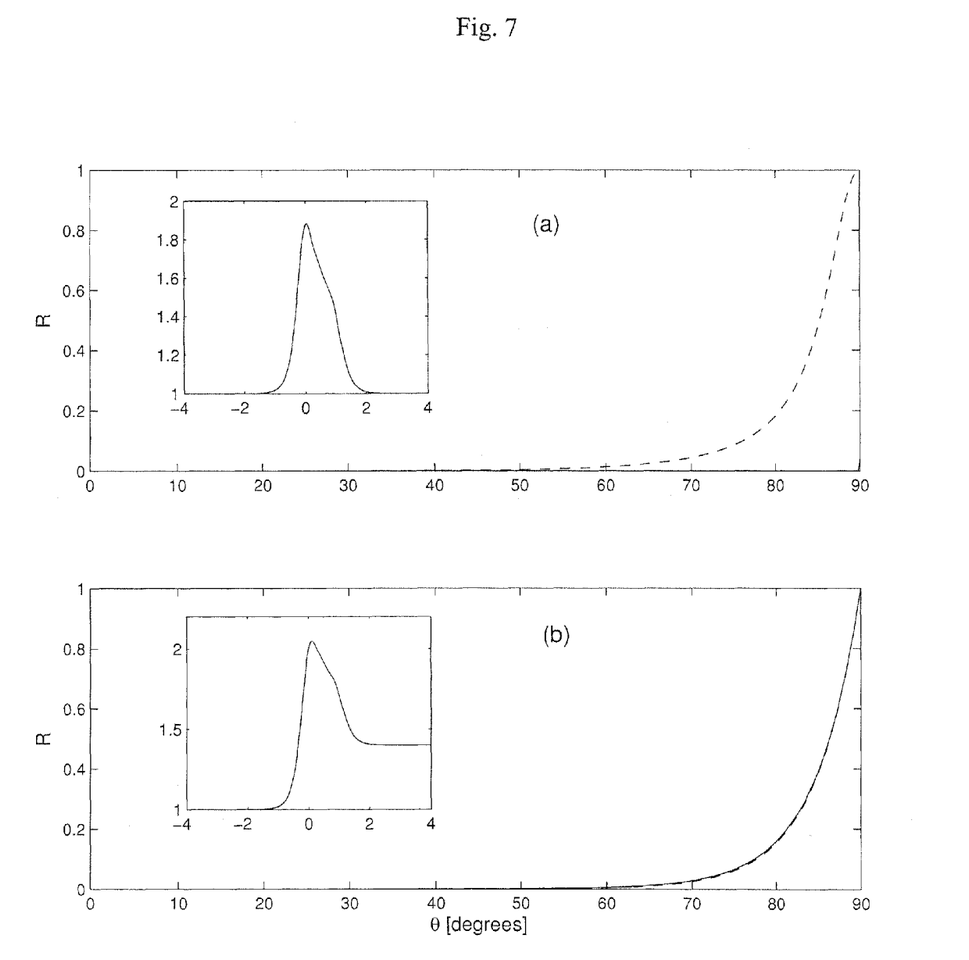
FIG. 7 is a graph illustrating the intensity reflection coefficient R as a function of angle of incidence θ for another inhomogeneous film according to the present disclosure (a) without or (b) with the substrate.
Figure 8:
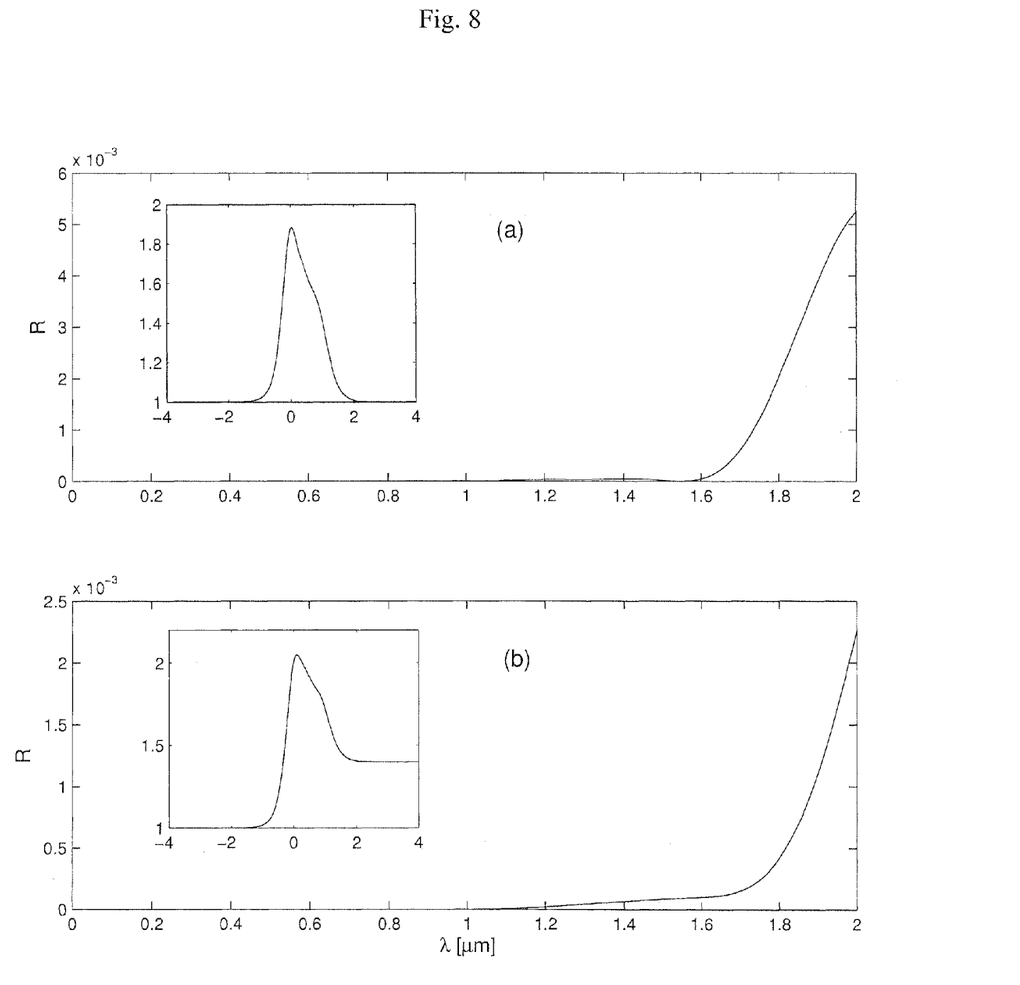
FIG. 8 is a graph of normal incidence intensity reflection coefficient R as a function of wavelength λ for the inhomogeneous film of FIG. 7 according to the present disclosure (a) without or (b) with the substrate.

This example considers a case wherein a three parameter family inhomogeneous film, grown on substrate, exhibits almost identical angular response for both TE and TM polarizations. Referring now to FIG. 7, this figure contains plots of the intensity reflection coefficient R as a function of angle of incidence θ for the inhomogeneous film (a) without or (b) with the substrate. The solid and dashed lines are for TE and TM polarizations, respectively. Referring also to FIG. 8, the normal incidence intensity reflection coefficient R as a function of wavelength λ for the inhomogeneous film (a) without or (b) with the substrate is shown. With respect to FIGS. 7-8, the inhomogeneous film (occupying $-4$ μm$\leq z \leq 4$ μm) is designed at wavelength 1.55 µm. The parameter combinations that yielded the curves of FIGS. 7-8 were chosen as follows, $\lambda=1.55$ µm, $A_1=11.0$, $A_2=8.0$, $A_3=5.5$, $\kappa_1=5.5$, $\kappa_2=4.0$, $\kappa_3=2.25$. For comparison, the results without the ramp in the upper panels of the corresponding figures are also shown. While the angle scan for TE polarization for the profile without the ramp is significantly better than that for the TM (see FIG. 7*a*), they are almost identical for the film grown on the substrate (FIG. 7*b*).

From the foregoing it is clear that reflectionless potentials may be utilized in the methods herein to design AR coatings. Such AR coatings can exhibit low reflectivity over ranges of angles and wavelengths. With the refractive index profile in place, an actual AR coating may be generated to match the profile based on known and emerging technologies involving titanium oxide films or other materials.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. An antireflective coating comprising at least one layer of a first material with a first index of refraction and a first thickness, the first index of refraction and first thickness substantially conforming to at least a portion of a refractive index profile matching a reflectionless potential;
   wherein the refractive index profile n(z) is represented by the equation:

$$n^2(z) = n_s^2 + \frac{2}{k_0^2}\frac{d^2}{dz^2}[\log(D)];$$

wherein $n_s$ is the refractive index of the medium, $k_0$ is the free space wave vector, and D is the determinant of a set of coefficients of simultaneous linear equations given by $$\sum_{j=1}^{N} M_{ij}f_j(z) = -A_i e^{\kappa_i z}, M_{ij} = \delta_{ij} + \frac{A_i e^{(\kappa_i+\kappa_j)z}}{(\kappa_i+\kappa_j)}, i = 1 \ldots N,$$

wherein $A_1 \ldots A_N$ and $\kappa_1 \ldots \kappa_N$ are free parameters, $f_j(z)$ is the Sturm-Liouville Eigenfunction, and $\delta$ is the Kronecker delta symbol.

2. The antireflective coating of claim 1, further comprising a second layer of a second material with a second index of refraction and a second thickness, the second index of refraction and second thickness substantially conforming to at least a portion of the refractive index profile matching a reflectionless potential.

3. The antireflective coating of claim 1, wherein the antireflective coating is applied to a substrate, the refraction index of the substrate being accounted for in the refractive index profile.

4. The antireflective coating of claim 3, wherein the substrate is selected from the group consisting of a prism, and a viewfinder.

5. The antireflective coating of claim 1, wherein the antireflective coating is applied as a thin film to a substrate.

6. The antireflective coating of claim 1, wherein a two parameter family of equations is utilized to derive the refractive index profile.

7. The antireflective coating of claim 1, wherein a parameter family of three or greater is utilized to derive the refractive index profile.

8. The antireflective coating of claim 1, wherein the refractive index profile is numerically derived.

9. An antireflective coating comprising at least one layer of a first material with a first index of refraction and a first thickness, the first index of refraction and first thickness substantially conforming to at least a portion of a refractive index profile matching a reflectionless potential;
   wherein the antireflective coating is applied to a substrate, the refraction index of the substrate being accounted for in the refractive index profile;
   wherein the substrate is selected from the group consisting of a prism and a viewfinder; and
   wherein the refractive index profile n(z) is represented by the equation:

$$n^2(z) = n_s^2 + \frac{2}{k_0^2}\frac{d^2}{dz^2}[\log(D)],$$

wherein $n_s$ is the refractive index of the medium, $k_0$ is the free space wave vector, and D is the determinant of a set of coefficients of simultaneous linear equations given by $$\sum_{j=1}^{N} M_{ij}f_j(z) = -A_i e^{\kappa_i z}, M_{ij} = \delta_{ij} + \frac{A_i e^{(\kappa_i+\kappa_j)z}}{(\kappa_i+\kappa_j)}, i = 1 \ldots N,$$

wherein $A_1 \ldots A_N$ and $\kappa_1 \ldots \kappa_N$ are free parameters, $f_j(z)$ is the Sturm-Liouville Eigenfunction, and $\delta$ is the Kronecker delta symbol.

10. The antireflective coating of claim 9, wherein a two parameter family of equations is utilized to derive the refractive index profile.

11. The antireflective coating of claim 9, wherein a parameter family of three or greater is utilized to derive the refractive index profile.

* * * * *